United States Patent [19]

Babitchenko

[11] Patent Number: 5,078,348
[45] Date of Patent: Jan. 7, 1992

[54] HOLDER FOR DISPLAYING FLAT PATTERNS IN TWO OR THREE DIMENSIONS

[76] Inventor: Rafail N. Babitchenko, 10537 Dempsey Ave., Granada Hills, Calif. 91344

[21] Appl. No.: 701,050
[22] Filed: May 16, 1991
[51] Int. Cl.$^5$ ............................................. A47G 29/00
[52] U.S. Cl. ..................... 248/124; 248/150; 248/370; 248/460; 40/610; 211/45; 211/196
[58] Field of Search ............... 248/124, 121, 130, 131, 248/132, 145, 150, 370, 316.7, 316.1, 460; 211/196, 45; 40/603, 606, 610

[56] References Cited

U.S. PATENT DOCUMENTS

| | | | |
|---|---|---|---|
| 1,879,760 | 9/1932 | Moore | 40/603 |
| 4,202,121 | 5/1980 | Maris et al. | 40/606 X |
| 4,490,934 | 1/1985 | Knapp | 40/603 |
| 4,832,303 | 5/1989 | Myeed | 248/460 X |
| 5,023,755 | 6/1991 | Rosenberg | 248/124 X |

FOREIGN PATENT DOCUMENTS 2921898 12/1980 Fed. Rep. of Germany ...... 248/124

Primary Examiner—Ramon O. Ramirez
Attorney, Agent, or Firm—Allan M. Shapiro

[57] ABSTRACT

The holder comprises a base together with an upright central post. The post carries thereon at least one pair of pivot carriers which are separately movable up and down the central post and clamped thereto at selected positions. Each of the pivot carriers has pivoted thereto a pair of arms. The outer ends of the arms are attached to each other by a pivot-carrying clamp. The pivot axes are all parallel so that two triangles lying in the same plane are formed. Paper holders may be attached to the arms at any selected position to display a flat pattern. When two such sets are used together, the flat pattern can be held in a 3-dimensional display.

20 Claims, 3 Drawing Sheets

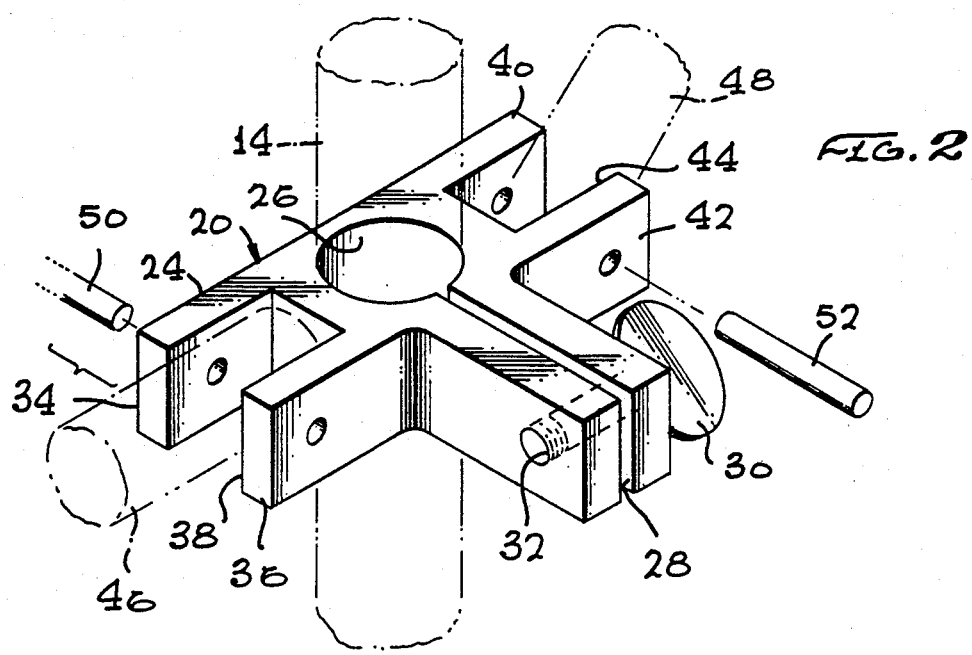
FIG. 2
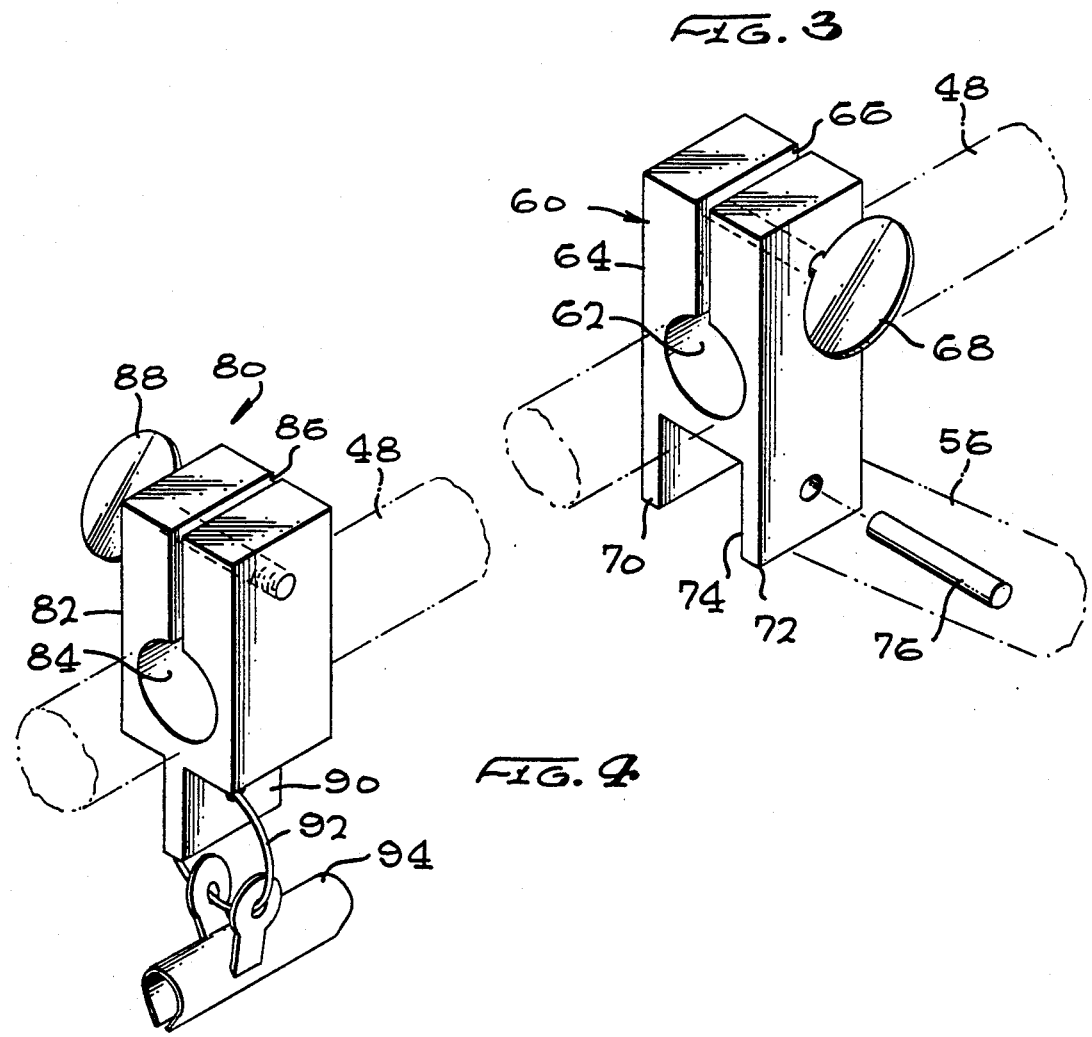
FIG. 3
FIG. 4

HOLDER FOR DISPLAYING FLAT PATTERNS IN TWO OR THREE DIMENSIONS

FIELD OF THE INVENTION

This invention is directed to a device which has a plurality of arms which can be arranged in various positions so that flexible flat patterns, such as drawing sheets, may be held and displayed in two or three dimensions.

BACKGROUND OF THE INVENTION

Modern architectural and engineering drafting is necessarily in two dimensions when done on the drawing board. Computer-aided design programs permit the creation of 3-dimensional visualizations in a computer memory and permit the rotation and sectioning of the structures. However, such capabilities have not been available in the production of flat drawings and other patterns in drawing board work. It is difficult to draw complex curved shapes on flat material and be able to create an understanding of the complex shape in mind. Thus, there is need for a structure which can employ a flat pattern, such as is useable on a drawing board, and which can display it in a curved manner so as to represent a non-planar surface. A holder for displaying flat patterns in two or three dimensions is required.

SUMMARY OF THE INVENTION

In order to aid in the understanding of this invention, it can be stated in essentially summary form that it is directed to a holder for displaying flat patterns in two or three dimensions wherein a central post carries thereon at least two pivot carriers, and each of the pivot carriers carries thereon two arms. Pivot pins interengage the pivot carriers and arms, and the pivot pins are parallel to each other. The arms are attached at their outer ends by a pivot-carrying clamp which is slidable on the arm to create different sizes and shapes of triangles. The arms carry paper holders for the engagement on a flat pattern for the display thereof. The paper holders are, thus, movable to various positions for 2- or 3-dimensional display. Two such structures may be employed on the same central post for engagement on the flat pattern in more locations and positions.

It is thus an object and advantage of this invention to provide a holder which is suitable for engaging on a flat pattern for displaying the pattern in two or three dimensions.

It is another object and advantage of this invention to provide a holder which has paper holders which can be positioned in various locations and clamped therein so as to permit the flat pattern to be displayed in various 2- and 3-dimensional configurations by positioning of the paper holders.

It is a further object and advantage of this invention to provide a holder which has two sets of paper holders which can be positioned at different angles with respect to each other for a wide variety of 2- and 3-dimensional configurations of holding of a display.

It is a further object and advantage of this invention to provide a holder for displaying flat patterns which can be conveniently and easily manufactured, folded for storage, and which can be readily positioned in the desired position for the desired 2- or 3-dimensional display of a flat pattern.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 2 is an enlarged isometric view of a pivot carrier for clamping on the central post of the holder.

FIG. 3 is a enlarged isometric view of the pivot-carrying clamp for clamping on one of the arms of the holder.

FIG. 4 is a enlarged isometric view of a paper holder for clamping on one of the arms of the holder.

DESCRIPTION OF THE PREFERRED EMBODIMENTS

Figure 1:
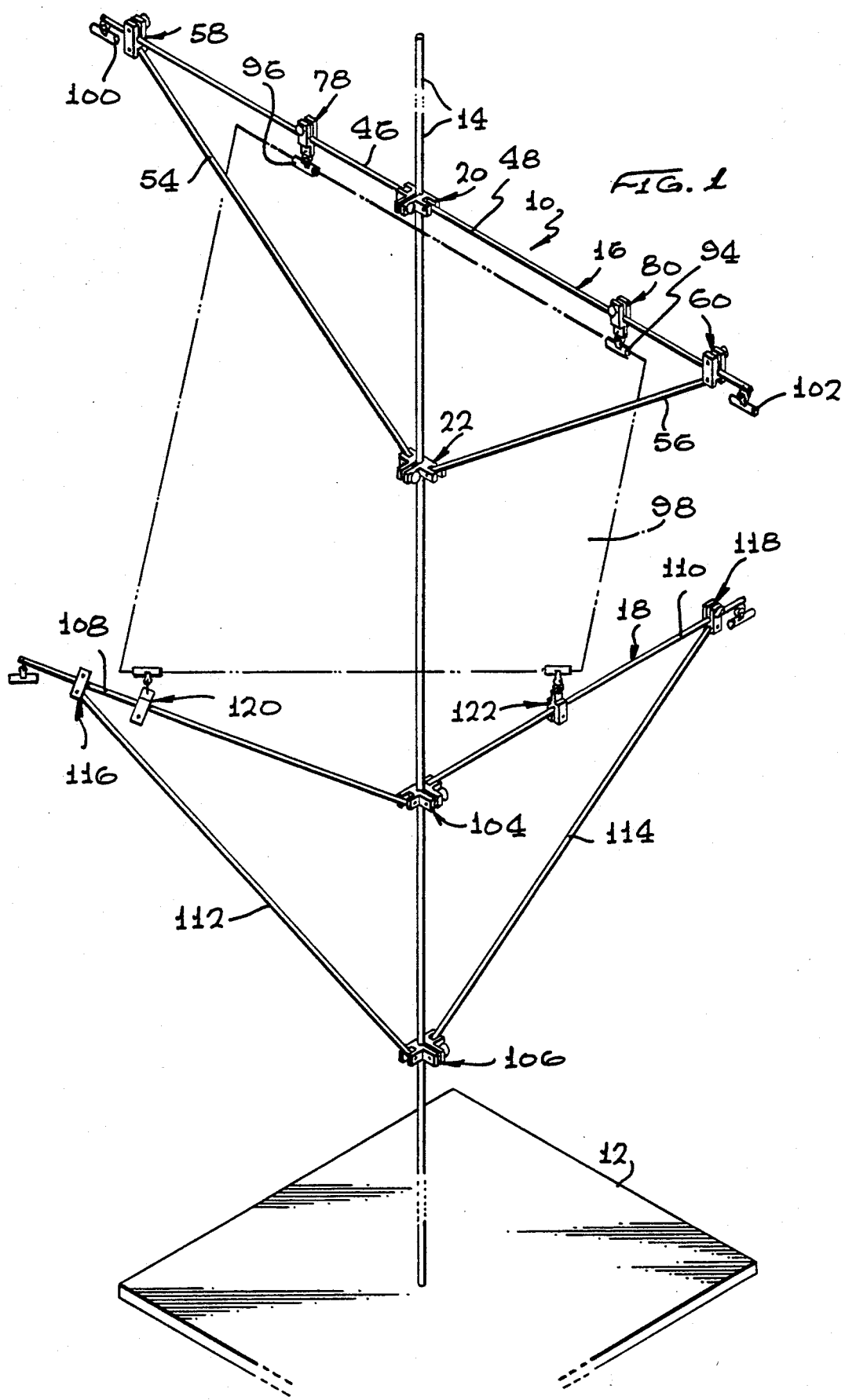
FIG. 1 is an isometric view of a first embodiment of the holder for displaying flat patterns in two or three dimensions in accordance with this invention.

The first preferred embodiment of the holder for displaying flat patterns in two or three dimensions is generally indicated at 10 in FIG. 1. The holder 10 has a base 12 which is flat on the bottom, or has appropriate feet for standing on a low surface such as the floor or a table. Central post 14 is secured in the base and extends upright therefrom, preferably in a vertical direction when the base is on a horizontal support. The central post is a cylindrical rod or tube of sufficient strength to support the remainder of the display. The holder 10 has an upper frame 16 and a lower frame 18. The frames are identical and are described below.

Pivot carrier 20 is the uppermost of the two identical upper and lower pivot carriers 20 and 22, shown in FIG. 1. Pivot carrier 20 is shown in enlarged detail in FIG. 2. The pivot carrier body 24 has a bore 26 therein which is sized to receive the central post 14. Slot 28 intersects bore 26. Slot 28 is closed by means of thumbscrew 30, which engages through a clearance hole in the body on one side of the slot and which threads into threaded hole 32 on the near side of the slot. In this way, tightening of the thumbscrew 30 closes slot 28 and clamps the body on central post 14.

The body 24 is bifurcated on opposite sides. Fingers 34 and 36 define an arm space 38 therebetween. Similarly, on the opposite side of body 24, fingers 40 and 42 define an arm space 44 therebetween. Arms 46 and 48 respectively extend into the arm spaces 38 and 44. The arms 46 and 48 are straight cylindrical rods and may be tubular. The arms are pivoted in pivot carrier 20 by means of pivot pins 50 and 52. Pivot pin 50 passes through appropriate pivot openings in fingers 34 and 36, as well as in arm 46. Pivot pin 52 passes through appropriate pivot openings in fingers 42 and 40, as well as arm 44. The pivot pins 50 and 52 are parallel to each other and are in a horizontal plane which is at a right angle to the bore 26.

Pivot carrier 22 is identical and carries pivoted therein lower arms 54 and 56, see FIG. 1. The outer ends of the lower arms 54 and 56 are respectively attached to the upper arms 46 and 48 by means of pivot-carrying clamps 58 and 60. The pivot-carrying clamps 58 and 60 are identical, and the pivot-carrying clamp 60 is shown in enlarged detail in FIG. 3. Pivot carrying clamp 60 has a bore 62 therethrough which receives the arm 48. The body 64 of clamp 60 has a slot 66 therethrough which extends all the way to the bore 62. Thumbscrew 68 is similar to the thumbscrew 30 and is threaded into the body so that, when it is tightened, it closes the slot 66. This closing of the slot tightens the bore 62 on arm 48. In this way, the clamp 60 can be positioned where desired along arm 48. Body 64 is bifurcated and has fingers 70 and 72 with arm space 74 therebetween. The arm 56 extends into this arm space. The arm 56 is pivoted in the bifurcation by means of pivot pin 76 so as to freely pivot around the axis of the pivot pin. In view of the fact that there is no freedom of the arms on the pivot pins except rotationally around the axis of each pivot pin, the axes of all the pivot pins in the upper frame are parallel to each other, and the two triangles defined by the upper frame on opposite sides of the center post lie in the same plane.

Also mounted on the upper arms 46 and 48 are paper holders 78 and 80. Paper holder 80 is shown in enlarged detail in FIG. 4. The paper holder 80 has a body 82 which has a bore 84 therein. The bore embraces arm 48. The body is slotted by slot 86, which extends down to the bore 84. Thumbscrew 88 is threadedly engaged in the body and extends across the slot so that tightening the thumbscrew closes the bore 84 so that the paper holder 80 may be appropriately positioned along the arm 48. Paper holder 80 includes a flange 90 on its body. The flange 90 has an opening therein which is engaged by ring 92. Ring 92 carries paper clamp 94. The paper clamp 94 may be any one of a group of commercially available spring-closed paper clamps. In addition to the paper clamp 94, which is shown in detail in FIG. 3, FIG. 1 also shows that paper clamp and additionally shows the paper clamp 96 on paper holder 78. From these two paper clamps, a flat flexible sheet 98 carrying the pattern to be displayed can be suspended. The specific orientation of the arms in the upper frame 16, shown in FIG. 1, is such that the two triangles defined are of equal size and shape, symmetrical on opposite sides of the central post 14. The paper holders can be moved along the length of the upper arms for various positioning of the paper clamps. In addition, either or both the pivot carriers 20 or 22 can be moved up and down the central post. The pivot-carrying clamps 58 and 60 may be independently moved toward and away from the central post 14 to provide different angles of the upper and lower arms on one side from those on the other side. In each case, the two triangles remain in the same plane, and the pivot pins in the frame remain parallel to each other. Thus, the paper clamps 94 and 96 have a great deal of flexibility in positioning. In addition, paper clamps 100 and 102 may be positioned at the outer end of the upper arms outboard from the pivot-carrying clamps 58 and 60 for support of larger flexible pattern-carrying flat material. The flat flexible sheet 98 may be any flexible drafting medium, such as paper, vellum, Mylar and the like. Furthermore, the flat flexible sheet may be a graphic medium for displaying a photographically-produced pattern. Such a system provides for display of the flat flexible sheet 98 in a 2-dimensional arrangement.

In order to achieve a 3-dimensional arrangement, the lower frame 18 is provided. The lower frame 18 is identical to the upper frame 16. The lower frame 18 has upper and lower pivot carriers 104 and 106 which can be independently moved up and down on the central post and clamped at the selected position. The upper pivot carrier 104 pivotally carries upper arms 108 and 110, while the lower pivot carrier 106 pivotally carries lower arms 112 and 114. The upper and lower arms 108 and 112 are pivoted together by means of pivot-carrying clamp 116, while the upper arm 110 and lower arm 114 are pivoted together by means of pivot-carrying clamp 118. These structures define two triangles which lie in the same plane, and all of the pivot pins are parallel to each other. However, the plane of the lower frame 18 can be rotationally displaced around the axis of central post 14 with respect to the plane of the upper frame 16. The arms and clamps of the lower frame can also be adjusted so as to define triangles of different sizes and positions. The paper holders 120 and 122 are positionable along the length of the upper arms 108 and 110 and are clamped to the edges of the sheet 98 to pull the flat flexible sheet 98 into the desired configuration. While properly positioning the arms and moving the paper holders along the arms, the flat flexible sheet can be pulled, twisted and turned to display the pattern thereon in three dimensions in the manner required by that pattern.

Figure 5:
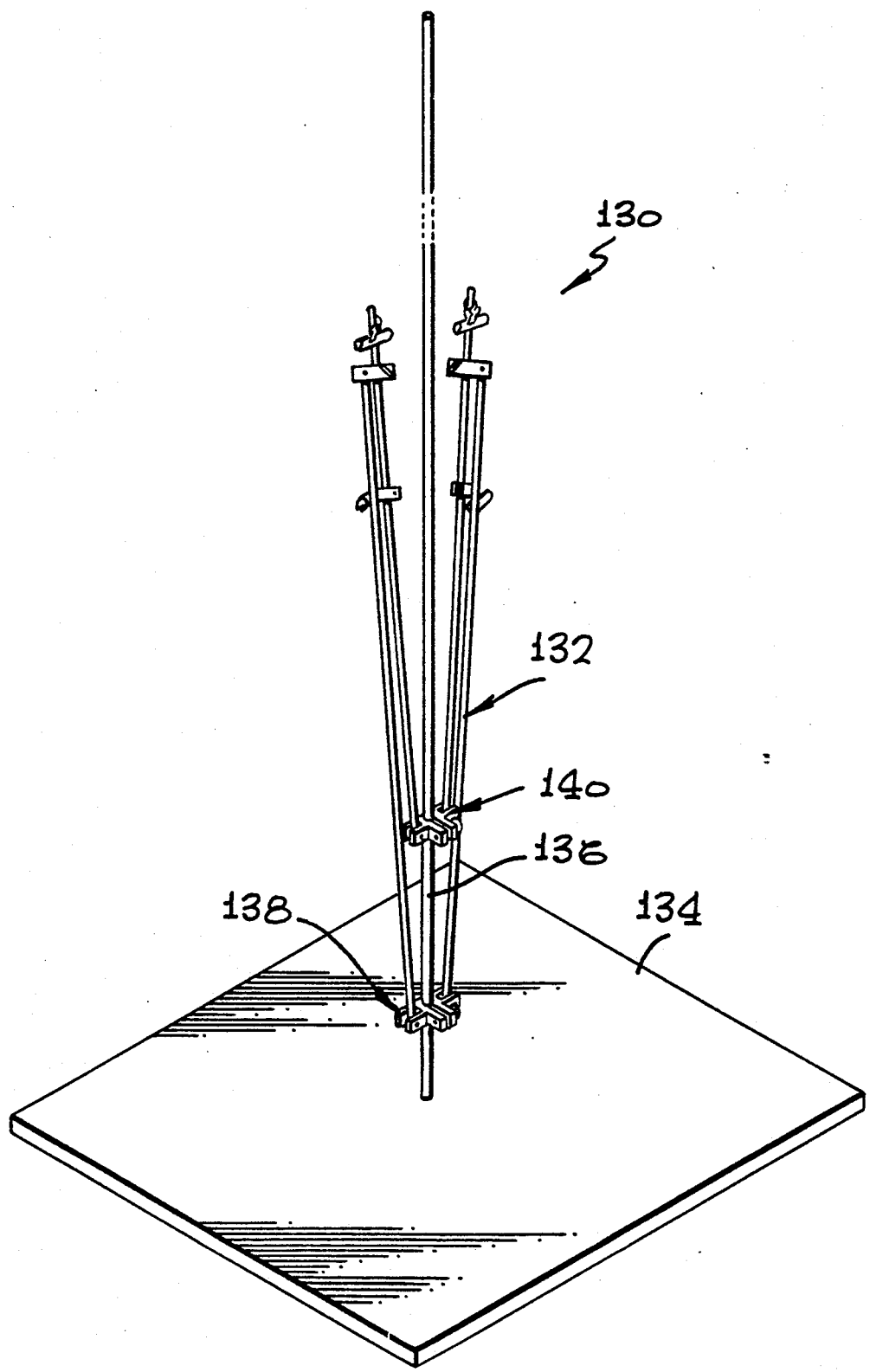
FIG. 5 is an isometric view of the second preferred embodiment of the holder for displaying flat patterns in accordance with this invention.

FIG. 5 shows a second preferred embodiment of the holder for displaying flat patterns in two and three dimensions wherein it is generally indicated at 130. The holder 130 is identical to the holder 10 except for the fact that it has only one frame 132 thereon. The frame 132 is identical to either the frame 16 or 18 shown in FIG. 1. Base 134 is arranged to rest on any flat surface, and central post 136 extends in an upright direction when it is resting in that manner. FIG. 5 shows the manner in which the holder 130 can be folded for storage. The same folding is also accomplished with the holder 10. The lower pivot carrier 138 is loosened and moved close to the lower end of the central post and is clamped thereon. The upper pivot carrier 140 is moved down the central post 136, and this draws the outer end of the arms upward. Furthermore, they can be manually grasped together while the clamps on the pivot carriers 138 and 140 are tightened. In this way, the upright post and the various clamps and arms are brought into a compact position. If desired, the central post 36 can be made removable from the base 134 for further arrangement for compactness of storage. It is appreciated that the holder 130 is more suitable for display of a flat flexible sheet with its pattern in a single plane, 2-dimensional orientation. The paper clamps at the ends of the upper arms may also grasp the flat flexible sheet so that it is held in four locations. These four locations may be in a straight line, although they need not be in the straight line. However, because of the pins and pivot pin structure, the paper clamps on any one frame will always lie in the same plane. The holder 10 in FIGS. 1 through 4 is suitable for use with a single flat flexible sheet positioned for 2- or 3-dimensional organization or may carry two separate flat flexible sheets, one above the other on the separate frames. Thus, the holder for displaying flat patterns in two or three dimensions is of wide utility because it can be readily adjusted into different configurations and because it is also of economic construction and can be readily stored.

This invention has been described in its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A holder for displaying flat patterns, comprising:
a post;
means for holding said post in a selected position;
first and second pivot carriers, means on each of said first and second pivot carriers for positioning each of said pivot carriers on said post and clamping each of said pivot carriers on said post, each of said pivot carriers having two pivot pins therein, said pivot pins of said first pivot carrier being parallel to each other and said pivot pins of said second pivot carrier being parallel to each other;
first and second arms respectively pivotally mounted on said two pivot pins of said first pivot carrier;
first and second arms respectively mounted on said two pivot pins of said second pivot carrier;
means adjustably attaching said first arms together;
means adjustably attaching said second arms together; and
a first paper clamp mounted on one of said first arms and a second paper clamp mounted on one of said second arms so that a flat pattern can be clamped in said paper clamps for display.

2. The holder of claim 1 wherein said first paper clamp is adjustably mounted on one of said first arms and said second paper clamp is adjustably mounted on one of said second arms.

3. The holder of claim 2 wherein there is a first paper holder attached to one of said first arms and said first paper holder carries said first paper clamp and there is a second paper holder mounted on one of said second arms and said second paper holder carries said second paper clamp, each of said paper holders having an opening therethrough embracing its arm and there is means on each said paper holder for closing said opening therethrough for clamping on its respective arm.

4. The holder of claim 3 wherein said paper holder has a screw therethrough for tightening said paper holder on its respective arm.

5. The holder of claim 1 wherein each said pivot carrier has two bifurcations therein and said pivoted arms lie within said bifurcations and said pivot pins pass across said bifurcations to pivot said arms with respect to said pivot carrier.

6. The holder of claim 5 wherein said pivot carrier has an opening therethrough and said opening embraces said post and there is means on said pivot carrier for clamping on said post.

7. The holder of claim 6 wherein said pivot carrier is slotted to said opening therethrough and there is a screw for tightening said slotted pivot carrier on said post to clamp said pivot carrier at a selected position on said post.

8. The holder of claim 1 wherein said means adjustably attaching said first arms together and said means adjustably attaching said second arms together each comprise a pivot-carrying clamp, each said pivot-carrying clamp having an opening therethrough for clamping on one of said arms and having a pivot pin therethrough for pivoting on the other of said arms.

9. The holder of claim 8 wherein each said pivot-carrying clamp embraces an arm and is slotted to clamp on said embraced arm for clamping thereon.

10. The holder of claim 9 wherein said pivot pins in said first and second pivot carriers and in said pivot-carrying clamps are parallel to each other.

11. The holder of claim 1 wherein said first and second pivot carriers, said first and second arms, said means adjustably attaching said first arms together and said second arms together and said paper clamps comprising a first frame, and there is also a second frame mounted on said post so that said holder can display a flat pattern in three dimensions by grasp on at least four places on the flat pattern.

12. The holder of claim 3 wherein each said pivot carrier has two bifurcations therein and said pivoted arms lie within said bifurcation and said pivot pins pass across said bifurcations to pivot said arms with respect to said pivot carrier.

13. The holder of claim 6 wherein said means adjustably attaching said first arms together and said means adjustably attaching said second arms together each comprise a pivot-carrying clamp, each said pivot-carrying clamp having an opening therethrough for clamping on one of said arms and having a pivot pin therethrough for pivoting on the other of said arms.

14. The holder of claim 9 wherein said first and second pivot carriers, said first and second arms, said means adjustably attaching said first arms together and said second arms together and said paper clamps comprising a first frame, and there is also a second frame mounted on said post so that said holder can display a flat pattern in three dimensions by grasp on at least four places on the flat pattern.

15. A holder for displaying flat patterns, comprising:
a post, means for holding said post in a selected position;
first and second pivot carriers mounted on said post for sliding along said post to a selected position and means for clamping each of said pivot carriers to said post at its selected position, each of said pivot carriers having pivot means thereon;
first and second arms pivoted on said pivot means of said first carrier;
first and second arms pivoted on said pivot means of said second pivot carrier;
a first clamp slidably mounted on one of said first arms to a selected position and means for releasably clamping said first clamp in its selected position, a pivot on said first clamp, the other of said first arms being pivotally mounted on said pivot on said first clamp;
a second clamp slidably movable along and clampable on one of said second arms, said second clamp carrying a pivot thereon, the other of said second arms being pivotally mounted to said second clamp, said pivot means on both of said pivot carriers and on said first and second clamps having pivot axes parallel to each other;
a first paper holder positioned on one of said first arms and a second paper holder positioned on one of said second arms, first and second paper clamps respectively attached to said first and second paper holders so that a flat pattern can be clamped therein and displayed.

16. The holder of claim 15 wherein each said pivot-carrying clamp has an opening therethrough for embrace on its respective arm and slidable positioning along its respective arm and each said pivot-carrying clamp is slotted so that it can be locked at a selected position on its respective arm for securing said arms in position.

17. The holder of claim 16 wherein each said first and second paper clamp has an opening therethrough for embrace of its respective arm and is slotted so that it can be clamped in selected position on its respective arm.

18. The holder of claim 15 wherein each said first and second paper clamp has an opening therethrough for embrace of its respective arm and is slotted so that it can be clamped in selected position on its respective arm.

19. The holder of claim 15 wherein said first and second pivot carriers, said first and second arms, said first and second pivot-carrying clamps and said first and second paper clamps comprise a first frame and there is also a second frame mounted on said post and spaced from said first frame so that one of said frames can be rotated on said post with respect to the other of said frames for displaying a pattern in three dimensions.

20. The holder of claim 19 wherein said pivot pins of said first frame are parallel to each other and said pivot pins of said second frame are parallel to each other and are oriented in a different direction than said pivot pins of said first frame.

* * * * *